United States Patent
Akasaka et al.

(10) Patent No.: US 8,597,856 B2
(45) Date of Patent: Dec. 3, 2013

(54) DIRECT METHANOL FUEL CELL

(75) Inventors: Yoshihiro Akasaka, Kawasaki (JP); Masato Akita, Yokohama (JP); Ryosuke Yagi, Kawasaki (JP); Hiroyasu Sumino, Tokyo (JP); Kazuhiro Yasuda, Yokohama (JP); Taishi Fukazawa, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 12/054,004

(22) Filed: Mar. 24, 2008

(65) Prior Publication Data

US 2009/0148739 A1 Jun. 11, 2009

(30) Foreign Application Priority Data

Mar. 28, 2007 (JP) ................. P2007-085767

(51) Int. Cl.
*H01M 8/04* (2006.01)
*H01M 4/86* (2006.01)

(52) U.S. Cl.
USPC ........................................... 429/513; 429/530

(58) Field of Classification Search
USPC ........................................................ 429/523
IPC ....................................... H01M 4/86,8/02, 8/10
See application file for complete search history.

(56) References Cited

U.S. PATENT DOCUMENTS

| | | | | |
|---|---|---|---|---|
| 6,733,915 B2 * | 5/2004 | Barton et al. | ................. | 429/481 |
| 2002/0146616 A1 * | 10/2002 | Yasuo et al. | ................... | 429/44 |
| 2003/0041444 A1 * | 3/2003 | Debe et al. | ................... | 29/623.1 |
| 2004/0146768 A1 * | 7/2004 | Nishihata et al. | ............... | 429/34 |
| 2004/0209136 A1 | 10/2004 | Ren et al. | | |
| 2006/0105159 A1 * | 5/2006 | O'Hara et al. | ............. | 428/318.6 |
| 2006/0141338 A1 | 6/2006 | Wang et al. | | |

FOREIGN PATENT DOCUMENTS

| | | |
|---|---|---|
| JP | 2001-283875 | 10/2001 |
| JP | 2005-514747 | 5/2005 |
| JP | 2005-174607 | 6/2005 |
| JP | 2005174607 A * | 6/2005 |

OTHER PUBLICATIONS

U.S. Appl. No. 11/858,395, filed Sep. 20, 2007, Masato Akita, et al.

* cited by examiner

*Primary Examiner* — Ula C Ruddock
*Assistant Examiner* — Daniel Gatewood
(74) *Attorney, Agent, or Firm* — Oblon, Spivak, McClelland, Maier & Neustadt, L.L.P.

(57) ABSTRACT

A direct methanol fuel cell includes a cathode catalyst layer; an electrolyte membrane; an anode catalyst layer; a first fuel control layer that is water-repellent and conductive and that has pores; a second fuel control layer that is water-repellent and conductive and that has larger pores than the those of the first fuel control layer; a third fuel control layer that is water-repellent and conductive and that has smaller porous than those of the first fuel control layer and those of the second fuel control layer; and an anode GDL layer that is water-repellent and conductive, wherein the membrane and the layers above are arranged in the above order.

14 Claims, 7 Drawing Sheets

DIRECT METHANOL FUEL CELL

CROSS-REFERENCE TO RELATED APPLICATIONS

This application is based on and claims priority under 35 USC 119 from Japanese Patent Application No. 2007-085767 filed on Mar. 28, 2007. The entire disclosure of each and every foreign patent application from which the benefit of foreign priority has been claimed in the present application is incorporated herein by reference, as if fully set forth.

BACKGROUND

1. Technical Field

The present invention relates to a fuel cell, particularly, to a direct methanol fuel cell (DMFC) using liquid methanol as fuel.

2. Related Art

A fuel cell converts chemical energy of fuel directly into electrical energy and outputs it by electrochemically oxidizing fuel such as hydrogen and methanol in the cell. Unlike the thermal power generation, the fuel cell does not produce NOx, SOx, or the like by combustion of fuel, therefore the fuel cell has been noticed as a clean electric energy source.

The fuel cell needs a structure for balancing supply of fuel and movement of produced reactant in order to improve the cell output. For example, JP-A 2001-283875 (KOKAI) discloses a technique of providing a layer containing water-repellent materials such as fluorine resin, silicon resin and polyethylene in a fuel electrode or an oxygen electrode.

Further, JP-A 2005-174607 (KOKAI) discloses a polymer electrolyte fuel cell having a structure for balancing permeability to gas and moisturizing property in a gas diffusion electrode. Particularly, a direct methanol fuel cell (DMFC) can be more reduced in size and weight than the other fuel cells such as a proton exchange membrane fuel cell (PEMFC) for gas fuel using hydrogen as fuel. Recently, various studies on the direct methanol fuel cell as a power source for a laptop, a cellular phone, or the like have been carried out.

A basic reaction in DMFC is as follows.

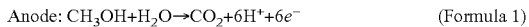

Anode: $CH_3OH + H_2O \rightarrow CO_2 + 6H^+ + 6e^-$ (Formula 1)

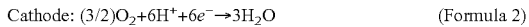

Cathode: $(3/2)O_2 + 6H^+ + 6e^- \rightarrow 3H_2O$ (Formula 2)

As shown in Formula 1, methanol and water molecule are required in the anode. Six protons and six electrons are produced, with carbon dioxide as waste, from one molecule of methanol and one molecule of water by use of, for example, an alloy catalyst containing mainly platinum and ruthenium. The electrons are used as output power by passing through an external electrical circuit.

As shown in Formula 2, oxygen, protons, and electrons are required in the cathode. The six electrons react with the six protons having passed through a proton-conductive electrolyte membrane and 3/2 molecules of oxygen in the cathode, and then produce 3 molecules of water as waste.

In the anode of the known DMFC, used is a coated carbon paper, which is produced by coating slurry in which hydrophobic fluoropolymer and carbon powder are mixed See, JP-A 2005-514747 (KOKAI).

SUMMARY

According to an aspect of the invention, there is provided a direct methanol fuel cell including a cathode catalyst layer; an electrolyte membrane; an anode catalyst layer; a first fuel control layer that is water-repellent and conductive and that has pores; a second fuel control layer that is water-repellent and conductive and that has larger pores than the those of the first fuel control layer; a third fuel control layer that is water-repellent and conductive and that has smaller porous than those of the first fuel control layer and those of the second fuel control layer; and an anode GDL layer that is water-repellent and conductive, wherein the membrane and the layers above are arranged in the above order.

DETAILED DESCRIPTION

Figure 1:
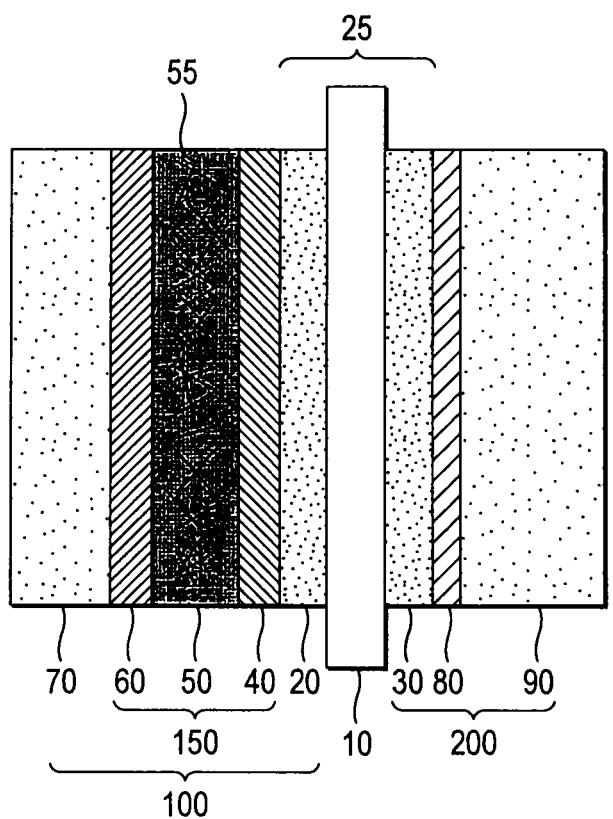
FIG. 1 is a cross sectional view of a direct methanol fuel cell according to the present embodiment.

First, a direct methanol fuel cell (DMFC) will be described. A membrane electrode assembly (electricity generating portion of the fuel cell) of the direct methanol fuel cell includes an anode current collector, an anode catalyst layer, a proton-conductive membrane, a cathode catalyst, and cathode current collector that are sequentially laminated in such an order. Since the current collector is made of a porous material and supplies liquid fuel or oxidizer gas to a catalyst layer, the current collector has been also referred to as a diffusion layer (hereinafter, referred to as a diffusion layer).

The catalyst layer is formed of, for example, a porous layer containing a catalyst activating material, a conductive material, and a proton-conductive material. For example, when the catalyst layer is a supported catalyst supporting a conductive material by a carrier, the catalyst layer is formed of the porous layer containing the supported catalyst and the proton-conductive material.

The diffusion layer and the catalyst layer are genetically referred to as an electrode, an anode diffusion layer and an anode catalyst layer are genetically referred to as a fuel electrode, and a cathode diffusion layer and a cathode catalyst layer are genetically referred to as an oxidizer electrode (oxygen layer) (hereinafter, referred to as a fuel electrode and an oxidizer electrode, respectively).

When a blended fuel including methanol and water is supplied to the anode catalyst layer and air (oxygen) is supplied to the cathode catalyst layer, catalysis represented by Formulas (1) and (2) occurs in the catalyst layer in each electrode. For this reason, the catalyst layer is also referred to as a reaction layer.

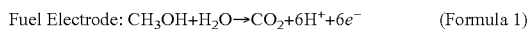

Fuel Electrode: $CH_3OH + H_2O \rightarrow CO_2 + 6H^+ + 6e^-$ (Formula 1)

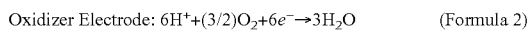

Oxidizer Electrode: $6H^+ + (3/2)O_2 + 6e^- \rightarrow 3H_2O$ (Formula 2)

In the anode, methanol and water react to each other to produce carbon dioxide, protons and electrons. The protons reach the cathode through the electrolyte membrane. In the cathode, oxygen, protons, and electrons reaching the cathode through an external circuit are bound to produce water.

In the DMFC, methanol and water in a solution state (methanol solution) are supplied from a liquid fuel storage to the catalyst layer of the fuel electrode to produce protons ($H^+$), electrons ($e^-$), and carbon dioxide on the catalyst (reaction formula: $CH_3OH+H_2O \rightarrow CO_2+6H^++6e^-$). The protons permeate the polymer solid electrolyte membrane and combine with oxygen in the catalyst layer to produce oxygen and water. At this time, the fuel electrode and the oxidizer electrode are connected to the external circuit, and thus electric power can be taken out by the produced electrons. The produced water is discharged from an air electrode to the outside of a system. Meanwhile, when the liquid fuel is directly supplied to the cell, the carbon dioxide produced in the fuel cell is diffused into the liquid fuel and discharged to the outside of the system of the fuel cell through a gas permeation membrane for permeating only gas.

In such a fuel cell, in order to obtain good characteristics of the cell, it is required that a proper amount of fuel is smoothly supplied to each electrode, the electrode catalysis rapidly and largely occur in a three-interface of the catalyst activating material, the proton-conductive material, and the fuel, the electrons and the protons are smoothly moved, and the reactant is rapidly discharged.

Hereinafter, an embodiment of the invention will be described in detail with reference to the drawings. In the description of the drawings, the same reference numerals are given to the same configurations and the repeated description will be omitted. The drawings are schematic and a relation between thickness and plane size, a proportion of thickness of layers, or the like may be different from that of the real thing. The drawings may include portions that are different from one another in a relation or proportion of size.

As shown in FIG. 1, the DMFC according to the present embodiment includes an electrolyte membrane 10, an anode catalyst layer 20 formed on a surface of the electrolyte membrane 10 on an anode 100 side, and a cathode catalyst layer 30 formed on a surface of the electrolyte 10 on a cathode 200 side.

The electrolyte membrane 10 is formed by performing a pretreatment to a perfluorocarbonsulfone membrane (e.g., Nafion 112 Trademark, manufactured by Dupont Inc.) available on the market cut by 40 mm long and 50 mm wide by the use of the known method (G. Q. Lu, et al Electro chimica Acta 49 (2004) 821 to 828) using hydrogen peroxide and sulphuric acid.

The anode catalyst layer 20 is mainly used to promote the reaction of methanol and water into protons, electrons, and carbon dioxide. For example, there may be used a layer formed in a manner where a Pt/Ru alloy catalyst (Pt/Ru Black HiSPEC6000, manufactured by Johnson & Matthey Inc.) and perfluorocarbonsulfone acid solution (Nafion solution manufactured by Dupont, Aldrich SE-29992, Nafion weight: 5 wt %) are mixed, dispersed, and then applied to a PTFE sheet. After drying, an amount (hereinafter, referred to as "loading amount") of Pt/Ru applied on the anode catalyst layer 20 is, for example, about 6 mg/cm$^2$.

The cathode catalyst 30 is mainly used to promote the reaction of protons, electrons, oxygen into water. For example, there may be used a layer formed in a manner where a Pt/C catalyst (HP 40 wt % PtonVulcanXC-72R manufactured by E-TEK Inc.) and perfluorocarbonsulfone acid solution (Nafion solution manufactured by Dupont, Aldrich SE-29992, Nafion weight: 5 wt %) are mixed, dispersed, and applied to a PTFE sheet. After drying, a loading amount of Pt on the cathode catalyst layer 30 is about 2.6 mg/cm$^2$.

The anode catalyst layer 20 and the cathode catalyst layer 30 formed on the PTFE sheet are cut and divided into 30 mm long and 40 mm wide, and then the anode catalyst layer 20 and the cathode catalyst layer 30 are brought in close contact with the electrolyte membrane 10 and thermally pressed at 125° in 100 kg/cm$^2$ for 3 minutes, thereby forming the anode catalyst layer 20 and the cathode catalyst layer 30 on the electrolyte membrane 10 (hereinafter, the lamination of the electrolyte membrane 10, anode catalyst layer 20, and the cathode catalyst layer 30 is referred to as CCM 25 (Catalyst Coated Membrane)).

In the CCM 25 obtained by detaching the PTFE sheet by the use of the above-mentioned manner, a total thickness including the anode catalyst layer 20 and the cathode catalyst layer 30 is about 90 μm. In the thickness, a thickness of the anode catalyst layer 20 is about 30 μm and a thickness of the cathode catalyst layer 30 is about 30 μm.

An anode GDL layer 70 (porous anode gas diffusion layer) is formed on the anode catalyst layer 20 side. A fuel control layer 150 is formed between the anode catalyst layer 20 and the anode GDL layer 70.

A cathode GDL layer 90 (porous gas diffusion layer on the cathode side) is formed on the cathode catalyst layer 30 side. A cathode MPL layer 80 (dense water-repellent layer on the cathode side) is formed between the cathode catalyst layer 30 and the cathode GDL layer 90.

On a surface of the anode GDL layer 70 opposite to the surface thereof having the fuel control layer 150 formed thereon, fuel supplying means (not shown) for supplying liquid fuel (methanol) to the anode GDL layer 70 is disposed. On a surface of the cathode GDL layer 90 opposite to the surface thereof having the cathode MPL layer 80 formed thereon, oxidizer gas supplying means (not shown) for supplying oxidizer gas (air) to the cathode GDL layer 70 is disposed.

As the anode GDL layer 70, there may be used, for example, Wetproofed (manufactured by E-TEK Inc., TGPH-090) where a water-repellent treatment is performed on a carbon paper TGPG-090 (manufactured by Toray Industries, Inc.) by the use of PTFE of about 30 wt %.

As the cathode MPL layer 80 and the cathode GDL layer 90, an MPL layer formed cathode GDL layer (e.g., Elat GDL LT-2500-W (thickness: about 360 μm) manufactured by E-TEK Inc.) having the cathode MPL layer 80 formed on the cathode GDL layer 90 may be preferably used.

The fuel control layer 150 includes a first fuel control layer 40 formed on a surface of the anode catalyst 20 opposite to the surface thereof having the electrolyte membrane 10 formed thereon, a second fuel control layer 50 formed on a surface of the first fuel control layer 40 opposite to the surface thereof having the anode catalyst layer 20 formed thereon, and a third fuel control layer 60 formed on a surface of the second fuel control layer 50 opposite to the surface thereof having the first fuel control layer 40 formed thereon.

The first fuel control layer 40 is formed of a porous substrate based on water-repellent materials and conductive materials. Herein, the water-repellent materials may include, for example, polytetrafluoroethylene (PTFE), tetrafluoroethylene-perfluoroalkylvinylether copolymer (PFA), tetrafluoromethylene-hexafluoropropylene copolymer (FEP), polychlorotrifluoroethylene (PCTFE), polyvinylidenefluoride (PVDF), polyvinylfluoride (PVF), tetrafluoroethylene-ethylene copolymer (ETFE), and the like. Conductive carbon is preferably used as the conductive material. The conductive carbon may include, for example, furnace black, acetylene black, graphitized black, and the like. DBP oil absorption of the conductive carbon constituting an anode intermediate layer 12 is, for example, in the range of 130 to 125 ml/100 g.

The second fuel control layer 50 includes a configuration where a porous substrate containing a fiber 55 is filled with water-repellent materials and conductive materials. Herein, carbon fiber having conductivity and corrosion resistance is preferably used as the fiber 55, but the fiber 55 is not limited to the carbon fiber. The same materials as those of the first fuel control layer 40 are used as the water-repellent materials and the conductive materials.

The third fuel control layer 60 is formed of a porous substrate based on water-repellent materials and conductive materials. The same materials as those of the first fuel control layer 40 are used as the conductive materials and the water-repellent materials.

A method of manufacturing the fuel control layer 150 will be described.

First, the second fuel control layer 50 is manufactured. In an initial slurry control, the slurry (slurry in a low viscosity state) is controlled in which carbon power (e.g., VULCAN XC-72R manufactured by CABOT Inc.) and PTFE 60 wt % emulsion (ALDRICH Polytetrafluoroethylene, 60 wt % dispersion in water) are mixed and dispersed so that weight of PTFE becomes about 50% in total.

Next, carbon paper TGPH-030 (manufactured by Toray Industries, Inc., thickness: about 100 µm) is prepared as a substrate by the use of the slurry. The water-repellent treatment is not necessarily on the substrate.

The controlled slurry is sprayed on both surfaces of the substrate using a pressure-spraying method to fill the substrate. The spraying is performed so as to keep the sprayed portions wet and not dry for at least several seconds, and ideally for about 10 seconds. In the pressure-spraying method, for example, a spray gun (EclipshHP-CS manufactured by Iwata Inc.) may be used. The application is performed preferably in a state where the anode GDL layer 25 is heated, for example, at 50° C. or more and the heated state is kept so that the spray surface is dry.

The spraying is performed for filling until a thickness including that of the carbon paper becomes 100 µm.

Next, the third fuel control layer 60 is manufactured.

This application is the same as the application using the pressure-spraying method in that slurry (slurry on a low viscosity state) on which viscosity control is not performed is sprayed on the substrate by the use of the simple spray gun. However, the spray filling is different in that the spraying is performed so as to keep the sprayed portions on the substrate wet and not dry for at least several seconds, and ideally for about 10 seconds. For example, since the spraying can be performed so as to keep the wet state as described above by controlling the carbon paper to be kept at about 50° C., it is possible to control the pore diameters.

As described above, the spraying is performed for filling until the thickness including that of the carbon paper becomes about 160 µm.

Finally, the first fuel control layer 40 is manufactured.

Herein, the spray filling is different from the application using the pressure-spraying method described in the embodiment for manufacturing the third fuel control layer 60, in the following points.

This application is the same as the application using the pressure-spraying method in that slurry (slurry on a low viscosity state) on which viscosity control is not performed is sprayed on the substrate by the use of the simple spray gun. However, the spray filling is different in that the spraying is performed in an atomizing shape for several seconds, and ideally so as to keep the sprayed portions on the substrate dry. For example, since the spraying can be performed so as to keep the dry state as described above by controlling the carbon paper to be kept at about 65° C., it is possible to control the pore diameters.

As described above, the spraying is performed on the surface of the second fuel control layer 50 until the thickness including that of the carbon paper becomes about 220 µm.

Figure 2:
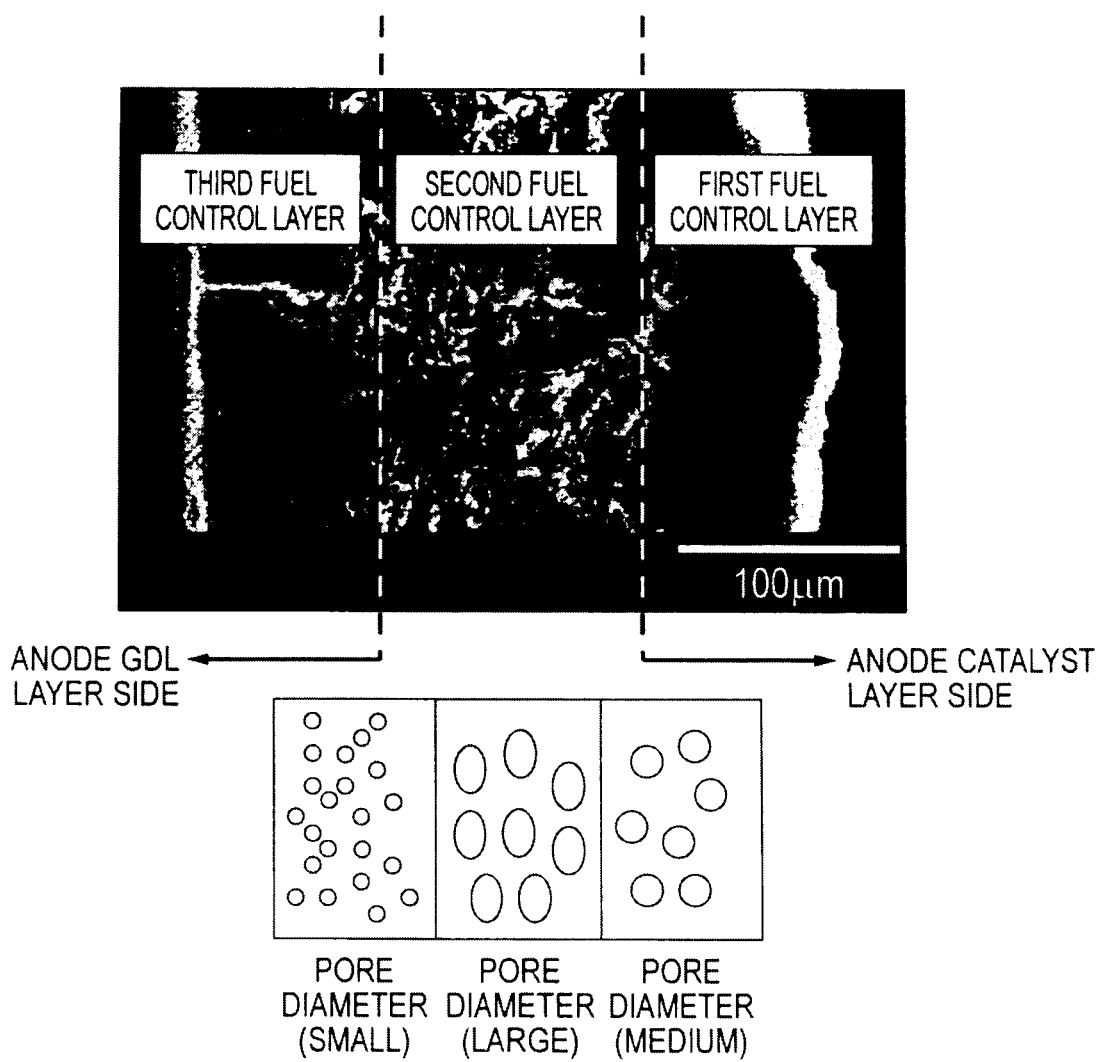
FIG. 2 is a cross sectional view of a direct methanol fuel cell that is actually manufactured.

FIG. 2 shows an example of an electron microphotograph of an anode MPL layer section in the present embodiment. In FIG. 2, it can be seen that carbon paper with a thickness of about 100 µm is filled with slurry, and slurry of 100 µm is added.

The pore diameters in the first fuel control layer 40 are, for example, in the range of 0.1 to 1 µm. The pore diameters in the second fuel control layer 50 are, for example, in the range of 1 to 10 µm. Further, the pore diameters in the third fuel control layer 60 are, for example, in the range of 0.01 to 0.1 µm. The pore diameters can be measured by a mercury pressurizing method.

A total thickness of the first and third fuel control layers is, for example, in the range of 100 to 300 µm.

In the third fuel control layer 60, as described above, the pore diameters of the third fuel control layer 60 are densely formed in a small size in comparison with the other fuel control layers. For this reason, the third fuel control layer 60 suppresses the amount of liquid fuel supplied to the anode GDL layer 70 and supplies the liquid fuel to the second fuel control layer 50. In the second fuel control layer 50, as described above, the pore diameters of the second fuel control layer 50 are formed in a large size in comparison with the other fuel control layers. For this reason, the second fuel control layer 50 diffuses the liquid fuel passing through the third fuel control layer 60 suppressing the amount the liquid fuel so that the liquid fuel is uniform in the whole anode, and the second fuel control layer 50 supplied the liquid fuel to the first fuel control layer. In the first fuel control layer 40, as described above, the pore diameters of the first fuel control layer 40 are formed in a medium size in comparison with the other fuel control layers. For this reason, the first fuel control layer 40 uniformly supplies the liquid fuel diffused to be uniform in the whole anode, to the anode catalyst layer 20.

As described above, in the DMFC according to the present embodiment, since the fuel control layers having the distribution of the pore diameters as described above are additionally formed between the anode GDL layer and the anode catalyst layer, the DMFC does not obstruct the stable use of current in a high current density area and can ensure the sufficient cell output power. Accordingly, it is possible to ensure stability for a long time as a fuel cell.

Example 1

Figure 3:
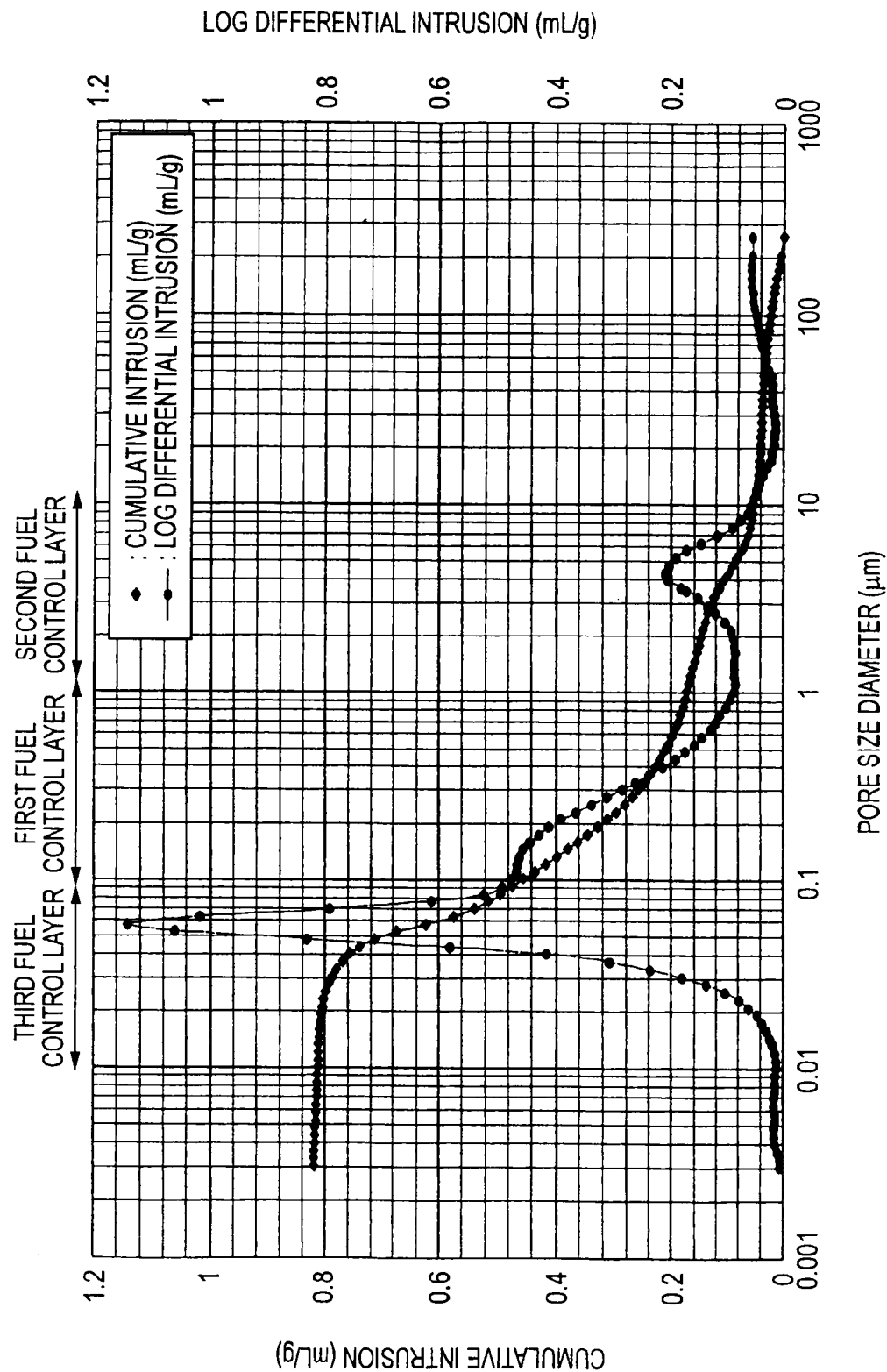
FIG. 3 is a graph illustrating distribution of pore diameters in a fuel control layer of an anode according to Example 1.
Figure 4:
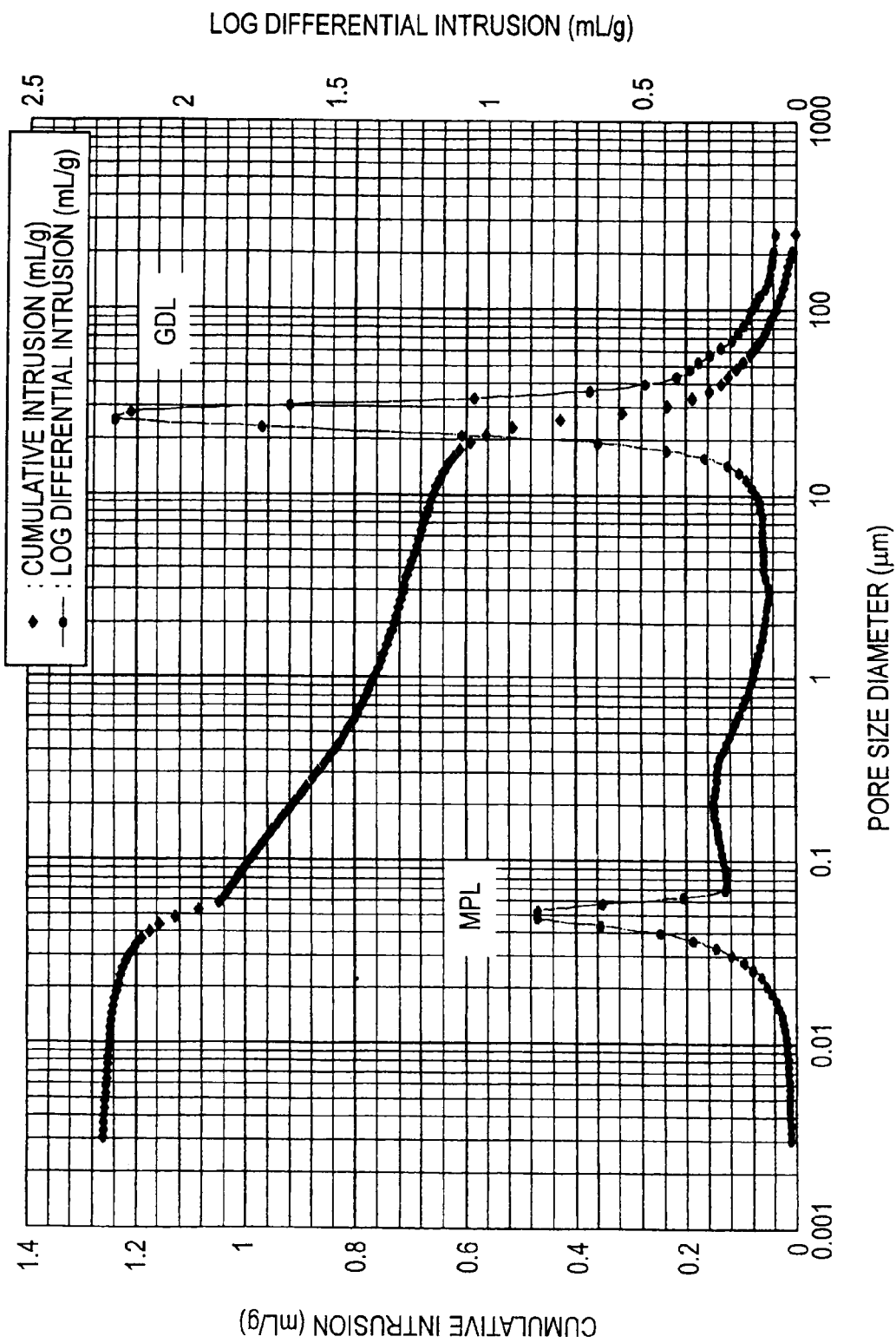
FIG. 4 is a graph illustrating distribution of pore diameters of a cathode.

An electricity generation test of the DMFC having the configurations described in the present embodiment was carried out. FIG. 2 shows a cross sectional view of an actually manufactured DMFC. FIG. 3 shows distribution of pores in a fuel control layer of an anode according to Example 1 and FIG. 4 shows distribution of pores in a gas diffusion layer (MPL attached GDL) constituting a cathode. Horizontal axes in FIGS. 3 and 4 denote a pore diameter in each layer and vertical axes denote cumulative capacity and differential pore capacity. In FIGS. 3 and 4, Pore Size Diameter denotes pore diameter, Cumulative Intrusion (mL/g) denotes cumulative capacity, and Log Differential Intrusion (mL/g) denotes differential pore capacity.

It can be seen from pore distribution of each fuel control layer in FIG. 3 that a first fuel control layer has a peak in the vicinity of a pore diameter of 0.15 µm, a second fuel control layer has a peak in the vicinity of a pore diameter of 4.5 μm, and a third fuel control layer has a peak in the vicinity of a pore diameter of 0.06 μm.

In can be seen from pore distribution of a cathode gas diffusion layer in FIG. 4 that an MPL has a peak in the vicinity of a pore diameter of 0.05 μm and a GDL has a peak in the vicinity of a pore diameter of 25 μm.

Fuel (methanol solution fuel) was supplied to the anode GDL layer at a concentration of 1.2 M and a fuel supply rate of 0.7 cc/min by fuel supplying means (not shown). Air (oxidizer) was supplied to the cathode GDL layer at an oxygen concentration of 20.5%, a humidity of 30%, and an air supply rate of 60 cc/min by oxidizer supplying means (not shown), the fuel cell was operated for a long time (maximum 20 hours), and then the cell characteristics of the output voltage was evaluated. A temperature measured by a temperature sensor (not shown) provided in the fuel supplying means and the oxidizer supplying means was set to 60° C. by a temperature controller (not shown), and air and fuel are not preheated.

Figure 5:
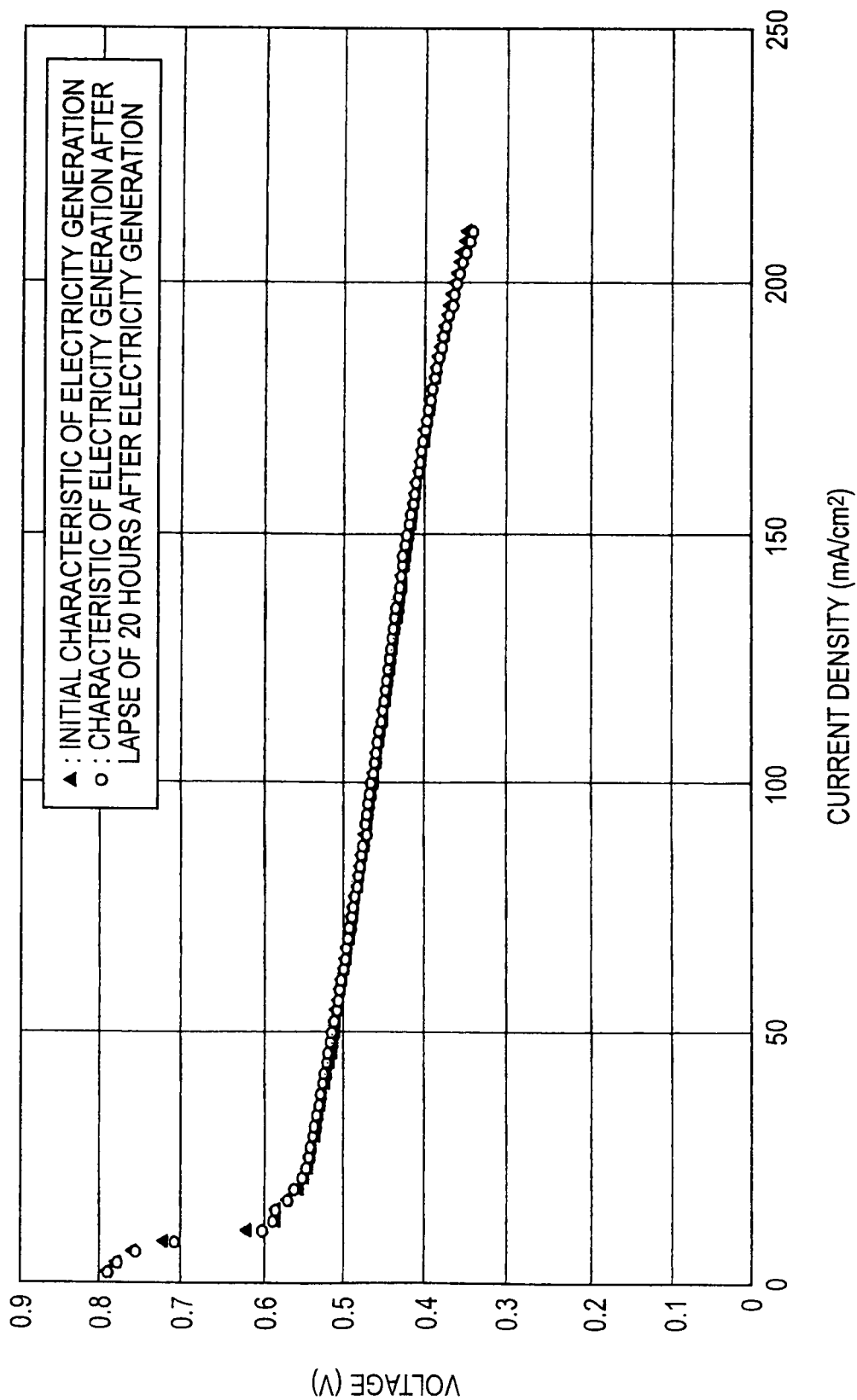
FIG. 5 is a graph illustrating voltage-current characteristics in Example 1.

A graph of current-voltage characteristics under the above-mentioned operation conditions is shown in FIG. 5.

In FIG. 5, it was confirmed that: output voltage at 0.15 A/cm$^2$ was about 0.42 V in the initial electricity generating operation; the output voltage was about 0.42 V even after lapse of 20 hours; but the cell output was kept stable even in the operation for 20 hours.

Comparative Example 1

A DMFC was manufactured with the same configurations as Example 1 except that the fuel control layer 150 was not formed in the configurations described in the present embodiment. The fuel cell was operated for a long time under the same operating conditions as Example 1 except that the air supply rate was 1.5 times that of Example 1 and then the cell characteristics of output voltage were evaluated. The reason of increasing the air supply rate is that the fuel control layer 150 is not formed; water is easily infiltrated into the cathode; and thus it is difficult to keep the voltage.

Figure 6:
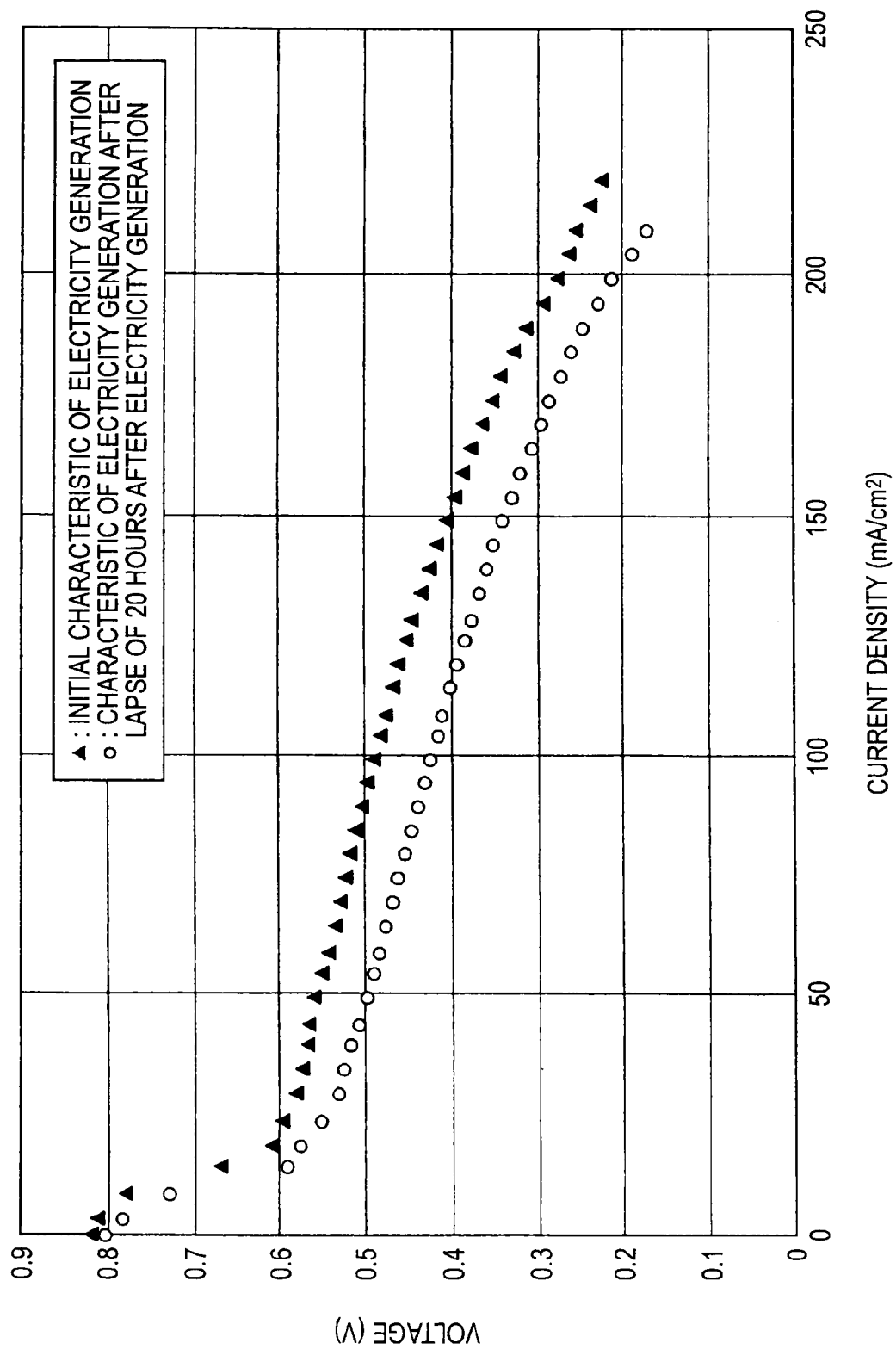
FIG. 6 is a graph illustrating voltage-current characteristics in Comparative Example 1.

A graph of current-voltage characteristics under the above-mentioned operation conditions is shown in FIG. 6.

In FIG. 6, it was confirmed that: output voltage at 0.15 A/cm$^2$ was about 0.40 V in the initial electricity generating operation; but the output voltage was decreased to about 0.343 V at the time of lapse of 20 hours after the electricity generation.

Comparative Example 2

A DMFC was manufactured with the same configurations as Example 1 so that the first fuel control layer 40, the second fuel control layer 50, and the third fuel control layer 60 of the invention are formed between the anode diffusion layer and the anode catalyst layer; and the first fuel control layer 40 and the third fuel control layer 60 have pores smaller than those of the second fuel control layer 50, except that the pore diameters are equivalent to each other. The fuel cell was operated for a long time under the same operating conditions as Example 1 and then the cell characteristics of output voltage were evaluated.

Figure 7:
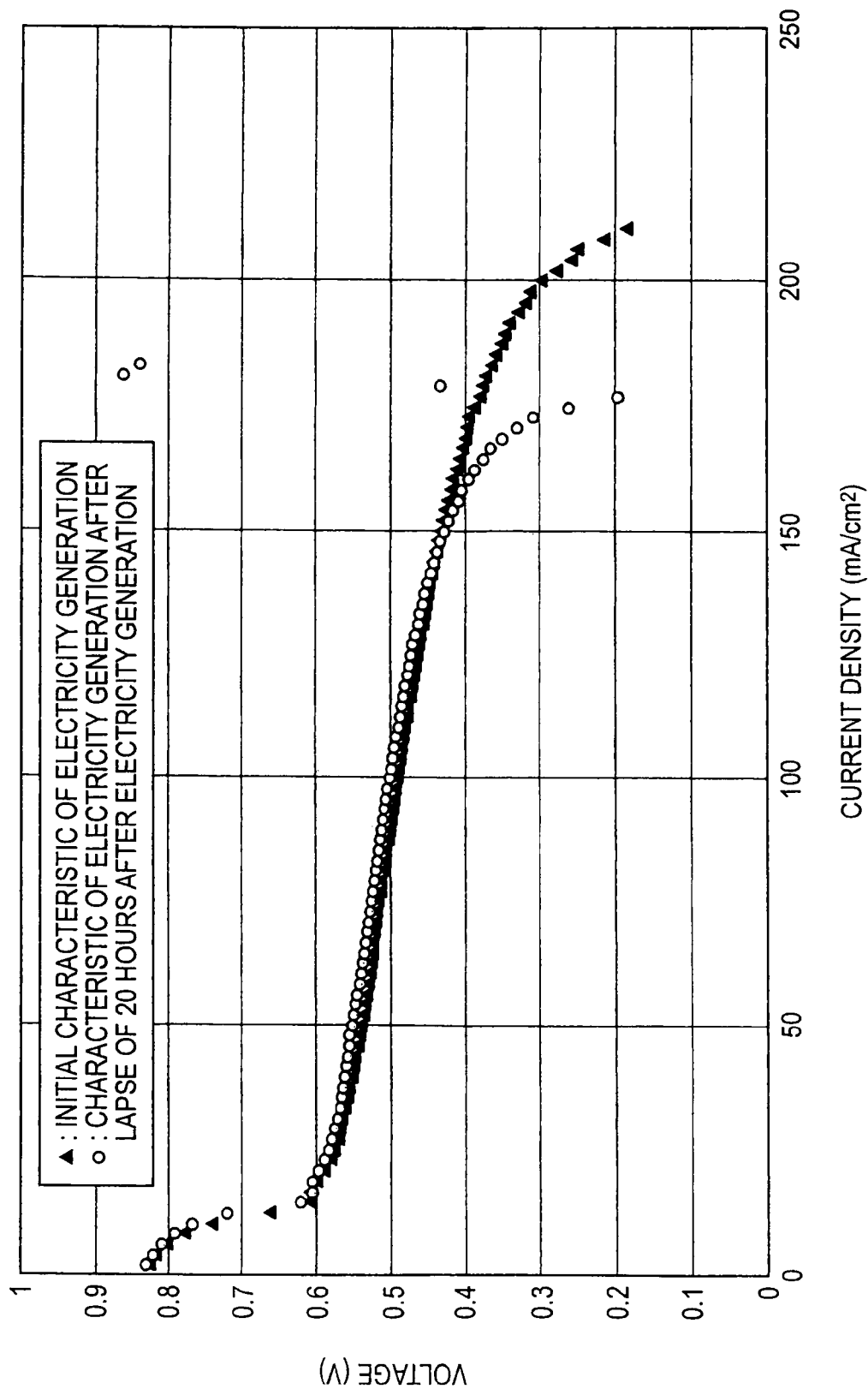
FIG. 7 is a graph illustrating voltage-current characteristics in Comparative Example 2.

A graph of current-voltage characteristics under the above-mentioned operation conditions is shown in FIG. 7.

In FIG. 7, it was confirmed that: output voltage at 0.15 A/cm$^2$ was about 0.43 V in the initial electricity. generating operation: but the output voltage was decreased to about 0.425 V at the time of lapse of 20 hours after the electricity generation; and the voltage was greatly decreased at high current.

What is claimed is:

1. A direct methanol fuel cell comprising:
a cathode catalyst layer;
an electrolyte membrane formed on a surface of the cathode catalyst layer;
an anode catalyst layer formed on a surface of the electrolyte membrane opposite to the surface of the electrolyte membrane having the cathode catalyst layer thereon;
a first fuel control layer that is formed on a surface of the anode catalyst layer opposite to the surface of the anode catalyst layer having the electrolyte membrane formed thereon and is water-repellent and conductive and has a plurality of pores;
a second fuel control layer that is formed on a surface of the first fuel control layer comprising a porous substrate comprising a fiber, a water-repellent material and a conductive material, wherein the second fuel control layer has a lower cumulative intrusion than the first fuel control layer and the third fuel control layer;
a third fuel control layer that is formed on a surface of the second fuel control layer opposite to the surface of the second fuel control layer having the first fuel control layer formed thereon and is water-repellent and conductive and has a plurality of smaller pores than those of the first fuel control layer and those of the second fuel control layer; and
an anode GDL layer that is formed on a surface of the third fuel control layer opposite to the surface of the third fuel control layer having the second fuel control layer formed thereon and is water-repellent and conductive,
wherein
the membrane and the layers above are arranged in the above order
the plurality of pores in the third fuel control layer have a diameter from 0.01 to 0.1 μm,
the plurality of pores in the first fuel control layer have a diameter from 0.1 to 1 μm, and
the plurality of pores in the second fuel control layer have a diameter from 1 to 10 μm.

2. The direct methanol fuel cell according to claim 1, wherein
the second fuel control layer comprises a conductive and corrosive-resistant fiber.

3. The direct methanol fuel cell according to claim 1, wherein
the first and third fuel control layers have a total thickness from 100 to 300 μm.

4. The direct methanol fuel cell according to claim 1, further comprising:
a cathode MPL layer that is arranged on the opposite side of the cathode catalyst layer from the electrolyte membrane and that is water-repellent and conductive; and
a cathode GDL layer that is arranged on the opposite side of the MPL layer from the cathode catalyst layer and that is water-repellent and conductive.

5. The direct methanol fuel cell according to claim 1, wherein
the fuel control layers comprise at least one water-repellent material selected from the group consisting of polytetrafluoroethylene (PTFE), tetrafluoroethylene-perfluoroalklyvinylether copolymer (PFA), tetrafluoromethylene-hexfluoropropylene copolymer (FEP), polychlorotrifluoroethylene (PCTFE), polyvinylidenefluoride (PVDF), polyvinylfluoride (PVF), and tetrafluoroethylene-ethylene copolymer (ETFE).

6. The direct methanol fuel cell according to claim 1, wherein
the fuel control layers comprise conductive carbon selected from the group consisting of furnace black, acetylene black, and graphitized black.

7. The direct methanol fuel cell according to claim 6, wherein
the DBP oil absorption of the conductive carbon is in the range of 125-130 mL/100 g.

8. The direct methanol fuel cell according to claim 4, wherein
the MPL has a peak pore diameter of 0.05 μm; and
the GDL has a peak pore diameter of 25 μm.

9. The direct methanol fuel cell according to claim 1, wherein
the second fuel control layer has a thickness of 100 μm.

10. The direct methanol fuel cell according to claim 1, comprising liquid fuel.

11. The direct methanol fuel cell according to claim 1, wherein the first fuel control layer is formed of a porous substrate comprising water-repellent materials and conductive materials.

12. The direct methanol fuel cell according to claim 1, wherein the third fuel control layer is formed of a porous substrate comprising water-repellent materials and conductive materials.

13. The direct methanol fuel cell according to claim 1, wherein the first fuel control layer has a lower cumulative intrusion then the third fuel control layer.

14. The direct methanol fuel cell according to claim 1, wherein the third fuel control layer has a higher cumulative intrusion then the first fuel control layer and the second fuel control layer.

* * * * *